United States Patent [19]
Titus et al.

[11] 3,812,620
[45] May 28, 1974

[54] APPARATUS AND PROCESS FOR SEGREGATING AND DECOMPOSING HETEROGENEOUS WASTE MATERIALS

[75] Inventors: Charles H. Titus, Newtown Square; J. Kenneth Wittle, Berwyn, both of Pa.

[73] Assignee: General Electric Company, Philadelphia, Pa.

[22] Filed: Mar. 22, 1973

[21] Appl. No.: 343,727

[52] U.S. Cl. .................. 48/65, 48/111, 48/197 A, 13/18, 48/209, 75/44 S, 110/8 E, 110/18 E
[51] Int. Cl. ............................................. C10j 3/18
[58] Field of Search .......... 48/209, 197 A, 111, 65, 48/62 R, 92, 113, 197 R; 110/8 E, 18 E; 250/542; 252/373; 219/383; 201/2, 5, 11, 19, 25; 202/108; 75/44 S; 266/33 S

[56] References Cited
UNITED STATES PATENTS

| | | | |
|---|---|---|---|
| 3,385,494 | 5/1968 | Themelis et al. | 75/10 |
| 3,503,347 | 3/1970 | Marr et al. | 110/8 |
| 3,511,194 | 5/1970 | Stookey | 110/8 |
| 3,575,119 | 4/1971 | Marr | 110/8 |
| 3,616,767 | 11/1971 | Southwick | 110/8 E |
| 3,668,120 | 6/1972 | Patterson | 210/60 |
| 3,697,256 | 10/1972 | Engle | 75/40 |
| 3,702,039 | 11/1972 | Stookey et al. | 48/111 |
| 3,715,200 | 2/1973 | Archibald et al. | 75/10 |
| 3,744,779 | 7/1973 | Perry | 266/335 |

*Primary Examiner*—S. Leon Bashore
*Assistant Examiner*—Peter Kratz
*Attorney, Agent, or Firm*—J. Wesley Haubner

[57] ABSTRACT

A method and apparatus for innocuous disposal of heterogeneous solid waste from residential and other sources comprises a pyrolytic furnace having a sump for collecton of molten glass and metal and an elongate electrode having an arcing tip in juxtaposition to the surface of a molten metal pool in the sump. An exhaust passage for gases has an inlet end near the arc. In operation a charge of heterogeneous waste above the metal pool is progressively immersed in the pool wherein organic material is decomposed by pyrolysis and inorganic material is melted into the pool.

13 Claims, 1 Drawing Figure

PATENTED MAY 28 1974  3,812,620
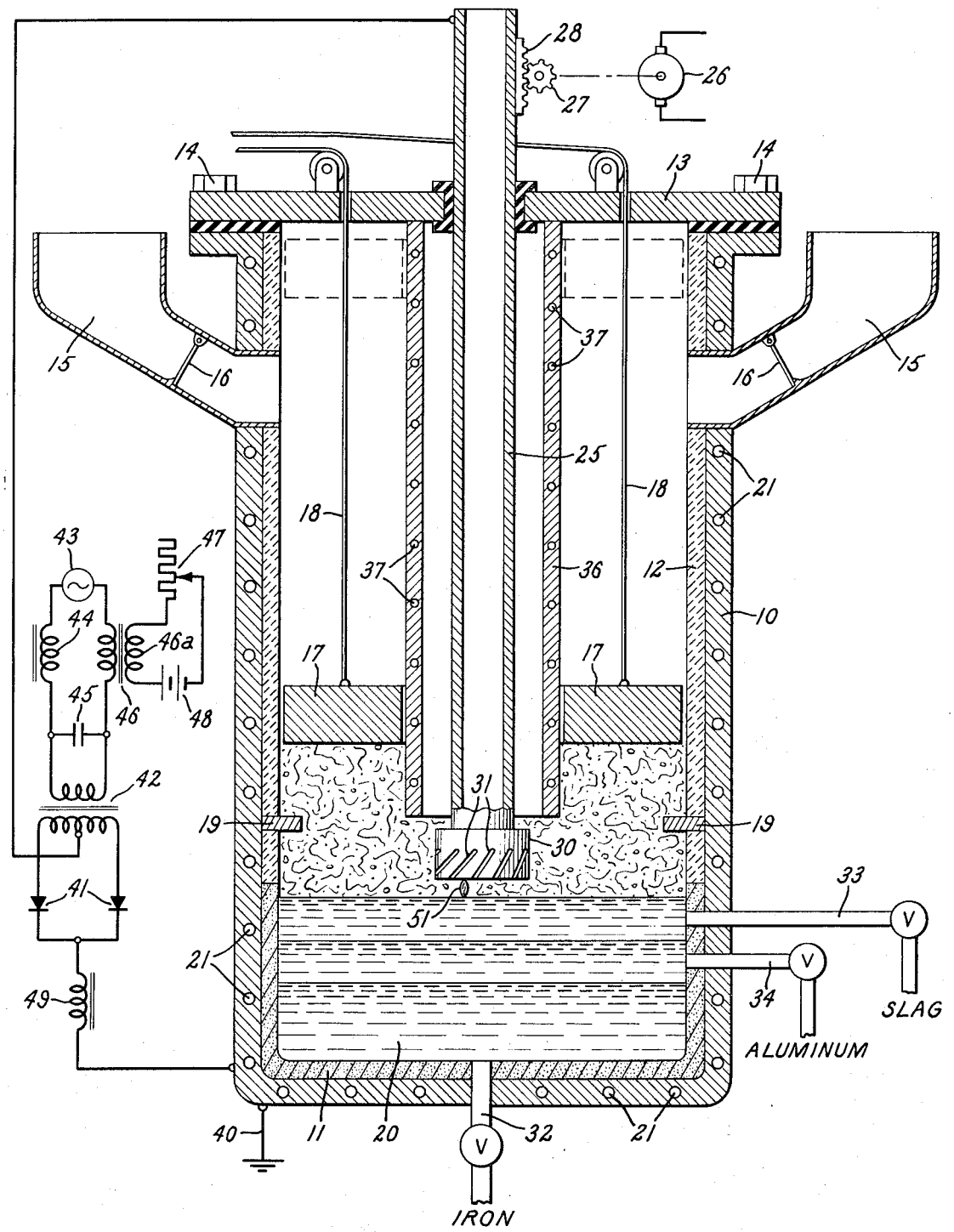

APPARATUS AND PROCESS FOR SEGREGATING AND DECOMPOSING HETEROGENEOUS WASTE MATERIALS

Our invention relates to separation and conversion of heterogeneous and primarily solid waste materials, or refuse, from residential, commercial, agricultural and industrial sources. More particularly it pertains to an improved apparatus and method for separating inorganic from organic materials and substantially completely converting the organic materials to innocuous reusable substances in a single operation performed upon a heterogeneous mixture of primarily solid waste material. The following U.S. patents are exemplary of the most nearly related prior art approaches presently known to applicants:

U.S. Patent No. 3,503,347-Marr Jr. et al.
U.S. Patent No. 3,575,119-Marr Jr.

Population growth and recent technological and social changes tend to increase the size and population density of urban residential and industrial areas. As a consequence the magnitude of world-wide waste disposal problems is approaching recognizably staggering proportion. In industrialized countries the present rate of refuse production is about 5 pounds of waste material per day per person. At this rate the production of refuse in the United States alone is of the order of 500,000 tons per day. Not only the quantity but also the heterogeneous character of these waste materials makes disposal an increasingly difficult problem. Such refuse typically comprises dry rubbish (such as paper, rags, plastics, rubber, leather sweepings, foliage and the like) garbage, chemicals, glass, metal, scrap building materials, discarded appliances and other equipment and solid commercial and industrial waste materials. Many discarded materials today are synthetic hydrocarbons, such as plastics and oils which are highly resistant to biological degradation. Such heterogeneous refuse is primarily solid, but may of course include appreciable quantities of water and other liquids in the mixture. In referring hereinafter to "solid" waste or refuse we intend to include all mixtures which are primarily solid although containing normal quantities of liquid.

Conventional means heretofore utilized for waste disposal include simple collection in dumps, open burning, sanitary land fill, ocean disposal, composting of selected materials and municipal incineration. These methods are all subject to one or more inadequacies, as slow biological degradation, incomplete conversion by combustion, air and water pollution, large storage area requirements, excessive transport costs and distances, and the like. Some efforts have been made to reduce volume, as by compacting and incineration, but resulting pollution is usually not diminished and is sometimes increased thereby.

Conversion of waste materials without oxidation, as by pyrolization, has also been proposed, but applicants are not aware of any method or apparatus in which it has been carried out on a large scale, without prior segregation of waste materials and to an extent designed to produce reusable metal, glass frit and innocuous gases, with substantially no air pollution or residual waste.

Accordingly, it is a principal object of our invention to provide an improved method and apparatus for treating heterogeneous waste material in a single operation to separate out inorganic materials and to convert substantially all remaining materials by pyrolysis into innocuous and commercially useful gases, all without appreciable air pollution or residual waste.

It is a more particular object of our invention to provide an improved pyrolytic furnace for disposal of heterogeneous waste materials and an improved pyrolytic process utilizing such a furnace to segregate inorganic components and convert substantially all organic material to common gaseous compositions.

In carrying out our invention in one preferred embodiment we provide a substantially air tight furnace chamber having therein a conductive arcing electrode or probe extending through the top wall of the chamber and vertically downward toward a liquid sump at the bottom of the chamber. An exhaust passage having an outlet at substantially atmospheric pressure has its inlet located near the arcing tip of the electrode probe. In operation the sump portion of the chamber is filled to an appreciable depth with a body, or pool, of molten metal derived from refuse heated by a direct current electric arc in the non-oxidizing atmosphere of the furnace. As the molten metal pool develops, the arc exists between its surface and the arcing tip of the electrode probe. Heterogeneous solid refuse material placed in the furnace chamber is pressed into the molten metal pool and therein subjected to pyrolytic decomposition at a temperature of the order of at least 1,600°C. Within the pool inorganic materials, primarily glass and metal, are melted and remain; immersed organic materials of all types are decomposed by heat in the absence of oxygen to low molecular weight gases such as carbon dioxide and methane. The gaseous products of pyrolysis within the molten pool enter the exhaust passage in the immediate vicinity of the furnace arc, where at least some gases from the pool are further pyrolized at temperatures in the order of at least 2,000°C. In the exhaust passage the gaseous products of pyrolysis cool and at least in part recombine into stable gaseous compounds, primarily carbonmonoxide, and hydrogen. Thus all components of heterogeneous solid waste material are reduced, without prior separation or burning, to molten inorganic material and useful but innocuous exhaust gases formed by or as a consequence of substantially complete pyrolytic decomposition of organic materials to elements or common simple compounds.

Our invention will be more fully understood and its various objects and advantages further appreciated by referring now to the drawing, the single FIGURE of which is a schematic cross-sectional view of a pyrolytic arc furnace embodying our invention.

Referring now to the drawing, we have shown in cross-sectional view a furnace chamber comprising an outer steel shell or enclosure 10 lined internally at the bottom with a layer 11 of graphite and in the upper region with a layer 12 of fire resistant clay, brick or the like. The furnace is illustrated as of cylindrical configuration having a lid or cover plate 13 which normally is fixed in closing position by bolts 14. While the furnace enclosure 10 may be of any desired size it is preferably sufficiently large to accommodate one or more truck loads of heterogeneous solid refuse material.

To charge the furnace with refuse material I provide at opposite sides and near the top of the chamber a pair of loading chutes 15 each having a gate valve 16 biased to closed position. In order to maintain downward pressure upon a charge of refuse we provide a large and heavy annular weight 17 suspended upon cables 18 and movable to an upper position (shown in dotted lines) during the charging operation. Near the bottom of the furnace, but above the graphite-lined lower end, we provide several abutments 19 protruding inwardly from the furnace walls to limit downward movement of the weight 17. The graphite-lined bottom of the furnace chamber constitutes a sump to collect a liquid body 20 of molten metal and glass in a pool as the refuse is heated. Desirably therefore the outer metal shell 10 of the furnace enclosure is cooled, as by circulating fluid traversing a plurality of fluid passages 21 in the shell 10.

Extending into the furnace chamber through the cover plate 13 and axially downward through the furnace we provide an elongate arcing electrode or conductive probe 25. The arcing probe 25 is slidably mounted in the furnace cover 13 for vertical movement, so that it may be adjusted to a desired arcing distance above the pool 20 of liquid metal which collects in the furnace sump when in operation. To illustrate vertical mobility of the arcing probe 25 we have shown schematically a motor 26 driving a pinion 27 which is in engagement with a rack 28 fixed to the probe 25 outside the furnace chamber. The arcing electrode or probe 25 is shown as tubular and is provided at its lower end with an annular arcing tip 30 having a plurality of inclined slots 31 open at their lower ends. To protect the main body of the probe 25 from direct contact with a charge of waste material in the furnace we provide a tubular protective sleeve or guard 36 concentrically spaced from the electrode probe 25. The tubular guard 36 is preferably formed of metal and provided with internal passages 37 to accommodate flow of a cooling fluid.

In the furnace embodiment illustrated the tubular arcing electrode 25 serves also as an exhaust stack for gases formed as a result of heat from the arc. While the tubular electrode itself need not be so utilized and may be solid, some exhaust passage must be provided, preferably having its inlet end positioned closely adjacent the arcing tip of the electrode 25. For example, the protective tube 36 might be utilized as an exhaust stack by providing an outlet port or conduit at or near its upper end.

The closed bottom end of the furnace chamber 10 is provided with a conductive graphite liner 11, as previously stated, and constitutes a sump for the collection of liquified inorganic components (primarily glass and metal) separated by melting from a heterogeneous mixture of refuse. In the bottom wall of the furnace we provide a tap 32 for draining molten metal from the sump. Near the top of the furnace sump we provide in the furnace side wall a tap 33 to draw off glass and slag. If desired intermediate side wall taps, as a tap 34, may be provided to draw off liquid metals (as aluminum) having specific gravities intermediate that of glass and iron.

To provide a substantially continuous direct current arc within the furnace chamber between the arcing tip 30 of electrode 25 and liquid metal pool 20 we connect the outer shell 10 of the furnace to ground, as at 40, and connect between the shell 10 and the electrode 25 a source of unidirectional electric current supply. Preferably the source of direct current supply is so poled that the electrode 25 is negative with respect to the grounded shell 10. In the drawing we have illustrated such a source of direct current supply as comprising a pair of rectifiers 41 connected through a transformer 42 for energization from a source 43 of alternating electric current supply. The primary winding circuit of the transformer 42 preferably includes a current limiting reactor 44, a power factor correction capacitor 45 shunting the primary winding and a saturable control reactor 46. The control reactor 46 includes a saturating winding 46a connected for energization through a variable resistor 47 from a direct current source such as a battery 48.

On the secondary side of the transformer 42 the center tap of the transformer winding constitutes the negative terminal of the d-c output circuit and is connected to the conductive arcing electrode 25. The rectifiers 41 are connected for full wave rectification, their positive terminals being connected together and through a smoothing reactor 49 to the grounded metallic furnace shell 10. The graphite liner 11 and molten metal pool 20, also being conductive, are maintained at ground potential. Thus the electrode 25 constitutes the negative terminal and the molten metal pool 20 constitutes the positive terminal of a direct current load circuit. As shown in the drawing these terminals (i.e., electrodes) are spaced apart in operation to provide between them an arc gap in which an arc 51 exists when the circuit is energized.

It will be evident to those skilled in the art that the establishment of an arc 51 may be initiated by lowering the movable arcing electrode or probe 25 into contact with the grounded elements in the furnace sump, whether that be the bottom of the sump or the surface of a body of molten or solidified metal occupying the sump. Upon initial charging of the furnace with waste materials, and in the absence of any molten or solid body of metal in the sump, the electrode 25 is lowered until conduction is established through a charge of waste material and is then withdrawn until an arc is formed. If, on the other hand, a pool or body 20 of metal exists in the furnace sump from prior operation the arcing electrode 25 is lowered into contact with the surface of the metal body to establish conduction and thereupon withdrawn to establish the arc 51.

In operation, it will be understood that our arcing furnace is charged in the manner previously described through the inlet chutes 15, the gate valves 16 thereafter closing to substantially exclude any further input of air. As described, the furnace charge may consist of a typical heterogeneous mixture of unsegregated, and primarily solid refuse or waste material from residential, commercial, industrial and/or agricultural sources. While some free water or other liquid material may be included, such waste material comprises primarily solids, principally metals, glass and organic materials. Available studies indicate that typical residential rubbish or solid waste material comprises by weight about 60 percent paper, 15 percent animal and vegetable waste materials, (i.e., garbage, plants, grass and the like) 5 percent plastic and other synthetic hydrocarbons, 8 percent glass and ceramics, 8 percent metal and 4 percent miscellaneous materials such as furniture, construction materials, rubber, paint, textiles, sweepings and the like. Thus about 80 percent to 85 percent of typical residential waste material is of organic composition. These organic materials comprise primarily carbohydrates, proteins, and hydrocarbons. As is well known to those skilled in the art, all such materials are made up principally of carbon, hydrogen and oxygen atoms and thus are decomposable at high temperatures into these few elements or common gaseous compounds of low molecular weight. Essentially the only materials contained in a typical mix of refuse, other than the organic materials, are metals, glasses and ceramics. The metals are essentially elemental substances and upon melting and refining are readily reusable. The glasses typically consist primarily of silicon dioxide with perhaps 25 percent other glass forming elements. These materials are not readily decomposed but are meltable into a slag which, upon refining, may be reused to a considerable extent.

The typical content of commercial waste materials is substantially the same as the residential wastes described above. Industrial waste materials, other than liquid wastes from chemical processes, are composed of a similar mix of materials. Agricultural wastes are ordinarily more heavily organic. Sewage, if included, is substantially wholly organic. Thus it is evident that heterogeneous solid waste materials from all these sources are subject to segregation by heat into melted glass and metal on the one hand and decomposable organic material on the other. By high temperature pyrolysis the organics may be converted to their fundamental constituent elements carbon, hydrogen and oxygen or to stable gaseous compounds of low molecular weight.

Assuming now that the furnace sump contains a pool 20 of molten metal and glass as illustrated in the drawing, and that the furnace is charged with a load of rubbish pressed downwardly by the annular weight 17, an arc between the surface of the molten metal pool and the arcing tip 30 of the electrode 25 is established and maintained within the furnace. Preferably means are provided, as illustrated by the slots 31, to ensure rotation of the arc around the annular tip 30. The tubular electrode 25 passes through the furnace cover, as illustrated, and thus constitutes an exhaust passage or stack for gases formed by the decomposition processes within the furnace. The protective tube 36 serves to keep the mass of refuse material away from the sides of the electrode 25 and thus to confine current conduction to the arcing tip 30.

The magnitude direct current supplied through the arc 51 is sufficient to maintain a temperature of the order of at least about 2,000°C in the region of the arc and to maintain the molten metal pool 20 at a temperature of the order of at least 1,600°C. While these temperatures will ensure that iron remains in a molten state and that organic materials are substantially fully decomposed before exhaust, it may be desirable to maintain temperatures up to 2,500° or 3,000°C in the molten metal pool and temperatures substantially above 2,000°C (as 3,000° to 10,000° or more) in the arcing region.

During operation of the furnace under action of the direct current arc 51 the furnace is closed to the further entrance of oxygen so that burning of the refuse content is minimized. Thus the waste materials are decomposed substantially wholly by pyrolytic action, both in the molten metal pool 20 into which they are forced by the action of the weight 17 and in the region of the arc 51 as the gaseous products of decomposition within the metal pool rise to the surface and pass into the exhaust passage through the tubular electrode 25. More particularly, as the charge of waste material is gradually and progressively immersed in the molten pool 20, the included metal and glass materials are melted and add to the volume of the pool. The immersed organic materials are decomposed by pyrolytic action into elemental carbon, oxygen or hydrogen or into low molecular weight organic compositions such as carbonmonoxide, carbondioxide, methane, ethane, acids, alcohols, aldehydes, ketones and the like. The products of this decomposition within the molten pool 20 are substantially wholly gaseous and thus rise to the surface and into the exhaust passage through the electrode 25. As these gases pass through the arcing region at the lower end of the electrode 25 the higher temperature in this region ensures that the gaseous products from the molten pool are further broken down by pyrolysis essentially to simple molecules and components. As these components pass upwardly through the exhaust stack they are cooled and at least partially recombined, primarily into carbonmonoxide and hydrogen gas. Preferably these gases are collected outside the furnace to be used as fuel in industrial processes or the like. As previously stated, the arcing furnace is closed against the entrance of oxygen during the pyrolytic processing. The exhaust stack outlet, however, is near atmospheric pressure, so that pressure within the furnace is not appreciably above atmospheric.

It is evident that as the processing proceeds the volume of molten glass and metal in the furnace sump will increase and its level will rise unless some of these molten materials are withdrawn continuously or intermittently. For this purpose I have illustrated the several taps 32, 33 and 34 through which glass and metals at various levels of the sump may be withdrawn. Typically glass will form a slag at the upper level and iron will be at the lower level. At intermediate levels metals of lesser specific gravity than iron, such as aluminum, may be separately tapped off.

To some extent the composition of the organic exhaust gases may be controlled by adding water or carbon to the furnace during processing, or by charging the furnace above the molten metal pool with hydrogen. While it is possible to add hydrogen as an atmosphere above the sump it is unlikely to be found necessary because of the large hydrogen content of organic materials contained in the charge.

In the operation of an electric arc furnace according to our invention it is highly desirable that a direct current arc be employed. While an alternating current arc of sufficient current magnitude will generate the required amount of heat it is subject to extinction at zero-current nodes both in its transfer from tooth to tooth around the slotted arcing tip 30 and/or as a result of gas or liquid blast effects in the decomposition process. Also, the extent that any electrolytic separation of elements may desirably take place in the molten metal pool, the effect can be attained only with a direct current arc.

It will now be evident to those skilled in the art that we have provided a process and apparatus for decomposing heterogeneous solid waste material without prior separation and into innocuous and useful gaseous products and reusable glass and metal residue. This is done in a single operation which may be carried out by batch or continuous processing. At the high temperatures utilized not only are all organic materials decomposed into essentially simple gaseous products but the glass content of the waste is separated from the metal content and may be separately withdrawn as useful residual products.

While we have described a particular embodiment of our invention by way of illustration many modifications will occur to those skilled in the art and we therefore wish to have it understood that we intend in the appended claims to cover all such modifications as fall within the true spirit and scope of our invention.

What we claim as new and desire to secure by Letters Patent in the United States is:

1. A method for separating organic from inorganic materials in a heterogeneous mixture of solid waste material and converting substantially all the organic components to useful gaseous products which comprises, maintaining a substantially non-oxidizing atmosphere in a chamber adapted to receive said mixture of solid waste material and including a molten metal sump, maintaining a pool of molten metal derived from said inorganic materials in said sump at a temperature of the order of at least about 1,600° C, progressively immersing said heterogeneous solid waste material in said pool thereby to melt inorganic components thereof and to pyrolyze organic components thereof substantially completely to a gaseous state without appreciable oxidation, and collecting said gaseous products above the surface of said pool in an exhaust passage leading out of said chamber.

2. The method of claim 1 wherein an electric arc is maintained between said molten metal pool and a juxtaposed electrode, the arc current being of a magnitude sufficient to maintain the region adjacent the arc at a temperature in the order of at least 2,000° C, and said gaseous products are constrained to traverse said region in entering said exhaust passage.

3. The method of claim 2 wherein said electric arc is a direct current arc.

4. The method of claim 2 wherein said arc current heats said molten metal pool to a steady state temperature of the order of at least 1,600° C.

5. The method of claim 4 which includes also tapping molten glass and metal from said pool to maintain the surface of said pool at a substantially constant level in said sump.

6. Apparatus for separating organic from inorganic materials in a heterogeneous mixture of solid waste material and pyrolytically converting substantially all organic components to useful gaseous products which comprises, a furnace chamber normally substantially closed to the entrance of air and including a sump adapted to receive a pool of molten metal, a conductive electrode in said chamber having an arcing tip closely spaced above the surface of said metal pool, means defining a closable inlet port in said chamber remotely spaced above the surface of said metal pool, said port being adapted to receive a charge of heterogeneous waste material into said chamber above the surface of said metal pool, means defining an exhaust passage for conducting gaseous products from said chamber, said exhaust passage having an inlet end in close juxtaposition to said arcing tip, means for progressively immersing said charge of waste material in said metal pool, and electric current supply means for maintaining between said arcing tip and the surface of said metal pool an arc current of sufficient heat generating capacity to maintain in the adjacent region a temperature of the order of at least 2,000° C and to maintain said metal pool at a temperature of the order of at least about 1,600° C, whereby inorganic components of said waste material remain in said pool and organic components are pyrolytically converted to gaseous form within said pool and further decomposed by pyrolysis in the region of said arc to form gaseous products exhausted from said chamber.

7. Apparatus according to claim 6 wherein said conductive electrode is tubular and extends upwardly through said chamber and an upper wall thereof thereby to constitute said exhaust passage.

8. Apparatus according to claim 6 wherein said arcing current is unidirectional.

9. Apparatus according to claim 8 including means for rotating the impinging end of direct current arc about said arcing tip.

10. Apparatus according to claim 6 wherein said conductive electrode comprises an elongate rod extending axially downward through said chamber, said apparatus including also a tubular protective shield surrounding said electrode in concentric radially spaced relation thereby to protect and insulate said electrode from waste material above the surface of said molten metal pool.

11. Apparatus according to claim 10 and including an annular weight vertically movable within said chamber and encircling said protective shield, said weight being adapted to rest upon said charge of waste material and progressively to immerse said charge in said molten metal pool as melting and decomposition of material in said pool proceeds.

12. Apparatus according to claim 6 wherein said conductive electrode comprises an elongate rod slidably mounted for axial movement in the top wall of said chamber and extending downwardly through said chamber, whereby said arcing tip may be adjustably spaced above the surface of said molten metal pool.

13. Apparatus according to claim 6 wherein said conductive electrode is mounted for vertical movement to provide adjustment of the spacing between said arcing tip and the surface of said molten metal pool.

* * * * *